United States Patent [19]

Shultz

[11] Patent Number: 4,916,608
[45] Date of Patent: Apr. 10, 1990

[54] PROVISION OF VIRTUAL STORAGE RESOURCES TO AN OPERATING SYSTEM CONTROL PROGRAM

[75] Inventor: Steven S. Shultz, Vestal, N.Y.

[73] Assignee: International Business Machines Corporation, Armonk, N.Y.

[21] Appl. No.: 869,084

[22] Filed: May 30, 1986

[51] Int. Cl.[4] ............................................. G06F 15/16
[52] U.S. Cl. .................................. 364/200; 364/232.1
[58] Field of Search ... 364/200 MS File, 900 MS File

[56] References Cited

U.S. PATENT DOCUMENTS

| | | | |
|---|---|---|---|
| 4,084,224 | 4/1978 | Appell et al. | 364/200 |
| 4,253,145 | 2/1981 | Goldberg | 364/200 |
| 4,325,120 | 4/1982 | Colley et al. | 364/200 |
| 4,410,940 | 10/1983 | Carlson et al. | 364/200 |
| 4,475,156 | 10/1984 | Feberico et al. | 364/300 |
| 4,649,479 | 3/1987 | Advani et al. | 364/200 |

OTHER PUBLICATIONS

Assembler Language Programming: IBM Systems/360, G. Struble, Addison-Wesley, 1969, pp. 255–258.
European Seearch Report for European Patent Application EP87106184.2.
IBM Technical Disclosure Bulletin, vol. 21, No. 2, Jul. 1978, pp. 463–468, N.Y., U.S.; R. M. Pipitone et al.: "Auxiliary Buffer Management", *p. 463, lines 1–13*.
Proceedings of the 1983 International Conference on Parallel Processing, 23rd –26th Aug. 1983, pp. 132–134, IEEE, N.Y., U.S.; T. W. Pratt: "The FEM-2 Design Method", *p. 133, right-hand col., lines 15–50*.
IBM Systems Journal, vol. 18, No. 1, 1989, pp. 18–46; R. A. MacKinnon: "The Changing Virtual Machine Environment: Interfaces to Real Hardware, Virtual Hardware, and Other Virtual Machines", *Section III*.
"An Introduction to Operating Systems", by Harvey M. Dietel, Addison-Wesley Publishing Co., pp. 53–68.
"An Introduction to Operating System", by Harvey M. Deitel, Addison-Wesley Publishing Co., p. 167.
IBM Publication "Virtual Machine/System Product-System Logic and Problem Determination Guide vol. 1 (CP)", Release 4, LY20-0892-3, pp. 50, 250–251, 278.

*Primary Examiner*—Raulfe B. Zache
*Assistant Examiner*—Jonathan C. Fairbanks
*Attorney, Agent, or Firm*—Baker, Maxham, Jester & Meador

[57] ABSTRACT

Method and apparatus for dynamically providing virtual storage resources to an operating system control program in a computing complex where the control program controls the concurrent execution of multiple virtual machines confer on the control program the capacity to gain access to virtual storage resources through the creation of pseudo-virtual machine control blocks that are available only to the control program.

4 Claims, 3 Drawing Sheets

PROVISION OF VIRTUAL STORAGE RESOURCES TO AN OPERATING SYSTEM CONTROL PROGRAM

BACKGROUND OF THE INVENTION

This invention relates to a new method for providing virtual storage resources to an operating system control program. With greater specificity, it relates to a method for providing virtual storage resources to an operating system control program through the creation of nondispatchable virtual machine control blocks that are usable only by the control program.

As is known, the virtual machine/system product (VM/SP) available from International Business Machines Corporation of Armonk, N.Y., includes an operating system used in a central computing complex such as the IBM System/370, which supports the execution of a variable number of tasks and allocates system resources among the tasks. This is also called multiprogramming. In this regard, a plurality of terminals or users can be connected to a central facility including a System/370. For each user, the VM/SP creates a virtual machine, which is a functional simulation of the central complex and all of its associated devices. The VM/SP controls the concurrent execution of multiple virtual machines on a single System/370.

As is known, the VM/SP includes a control program (CP) which manages the resources of the processing complex by means of the virtual machines in such a manner that each user appears to operate with sole and full control of the System/370 resources.

In a multiuser system, when a new user signs on, the control program VM/SP creates a virtual machine for that user. In creating the virtual machine, the CP creates apparent hardware resources consisting of software emulations of processing equipments such as a 370 CPU and virtual storage resources. In addition, a virtual machine control block (VMBLOK) is built which is resident in the CP. The VMBLOK is a data structure which provides the linkage between the CP and the virtual machine. The VMBLOK contains a number of status indicators and connectors; among these are linkages to the virtual storage allocated to the created virtual machine. These storage linkages include designation of the identity, location, and extent of the allocated virtual storage.

During the initialization of the CP, when the VM/SP is first compiled by the processing complex, a system virtual machine (SVM) is generated. The SVM is the CP's virtual machine, which the CP uses in implementing its control of system resources.

Conventionally, the computing complex controlled by the VM/SP includes a virtual storage facility compounded of real storage and direct access storage. The rear storage portion includes direct-access storage addressable by a program and from which instructions and other data can be transferred to processor hardware for subsequent execution or processing. The second portion consists of auxiliary storage, usually in the form of a direct access storage device (DASD) which is indirectly addressable. Typically, the auxiliary storage is indirectly addressed by a program in the CP that involves mapping or translation functions resident in a module of the CP for conversion of a logical address into an absolute memory address. Virtual storage generally is treated, for example, in Chapter 2 of Hwang and Briggs, "COMPUTER ARCHITECTURE AND PARALLEL PROCESSING," published in 1984 by McGraw-Hill.

As is known, the CP of the VM/SP includes a subsystem for allocating to a process a portion of the virtual storage resources of the computing complex. Typically, the virtual storage allocation is made when a virtual machine is created. Other CP subsystems manage the transfer of program information between real and auxiliary storage.

It will be appreciated by those skilled in the art that the allocation of real memory resources to a currently-executing process is done in the IBM VM/SP on a segmented page basis, with the allocation handled by a paging subsystem of the CP. For an understanding of the VM/SP paging subsystem, reference is made to IBM Publication LY20-0892-3, Release 4, entitled VIRTUAL MACHINE SYSTEM PRODUCT SYSTEM LOGIC AND PROBLEM DETERMINATION GUIDE.

The CP of the VM/SP has a basic, irreducible set of functions that enable it to operate a System/370 in a multiprogram context, serving a plurality of users as described above. Increasingly, system programmers are adding to this basic functional complement by integrating into the CP novel functions that enhance the primary mission of the CP. Other, specialized functions are also being added to the CP in many user-specific variations of the multiterminal version of the System/370. As the functional capacity of the CP grows, so, too, does its need for storage resources. However, the virtual storage resources available to the CP through the SVM are limited to 16 megabytes. Of this allocated capacity, 11 megabytes are typically needed to store the currently-unused CP portions in auxiliary storage. The CP, for its own current task, uses real storage, plus up to approximately 5 megabytes of virtual storage. Currently, the extra storage for added CP functions is found in these 5 extra megabytes of virtual storage.

Two procedures exist for obtaining unused portions of the storage capacity allocated to the CP. In the first, the SVM responds to CP process calls by inspecting the 5 megabyte virtual storage excess to determine whether any space is available. If space is available, the SVM will allocate it to the calling process. However, generally, substantially less than 5 megabytes is available, frequently resulting in the suspension of CP processes awaiting storage space until such space is available.

A second technique for obtaining storage capacity for CP processes is called extension. Extension is embodied in the well-known extended control-program support facility available for VM/SP versions of the System/370. This extended support facility obtains real storage capacity outside the portion allocated to the CP. However, its operation requires the suspension of all virtual machine activity while the real storage area is being obtained or released. In this regard, the extended support capability increases the overhead cost of the VM/SP and decreases its operational efficiency.

SUMMARY OF THE INVENTION

This invention provides method and apparatus for dynamically providing virtual storage resources to an operating system control program outside of the context of the SVM. And without the need for memory extension. The advance is based upon the observation that various CP processes can be treated in the same manner as system terminals by the creation of quasi-virtual machines, which are not dispatchable, but which are available only to CP processes. In this regard, "dispatching" refers to allocation by the CP of processing time and resources to virtual machines that are executable and currently competing for computing complex time and resources. The sense of the phrase is that system time and resources are "dispatched" to the use of system terminals. In contrast, the term "non-dispatchable" is introduced to signify those virtual machines and virtual machine appurtenances that are executable only in response to CP functions, and not in response to user virtual machines.

The method of the invention dynamically provides virtual storage resources to a computer operating system control program controlling the concurrent execution of multiple virtual machines on a computing complex having a virtual storage facility shared by the virtual machines. The method includes the steps of requesting storage resources to support a control program processing requirement. In response to the control program request, the method further establishes a non-dispatchable, pseudo-virtual machine control block including virtual storage resource linkages. Finally, virtual storage resources are devoted to the processing requirement and connected to the storage resource linkages of the pseudo-virtual machine control block.

This method permits a system programmer to integrate the execution of CP functions into the overall multiprogramming scheme of the VM/SP by treating such functions essentially as special CP terminals, each being furnished with a quasi-virtual machine. However, to distinguish the structures created for the CP processes from those created by external system terminals, the prefix "pseudo" is used. In keeping with the lexicon established above, a "pseudo-virtual machine" is also a non-dispatchable virtual machine. For completeness, it is posited that a quasi- or pseudo-virtual machine consists essentially of a VMBLOK and allocated virtual storage resources linked to the VMBLOK. However, this does not exclude the possibility of creating a complete virtual machine for use by the CP function, if needed.

The invention is also expressed as a system for dynamically providing virtual storage resources to a computer operating system control program. The system includes a multifacility computer complex having a virtual storage facility and capable of being connected to one or more remote terminals. A multifunction control program is resident in the computer complex for controlling access to the facilities of the computer complex by a plurality of autonomous terminals through associated virtual machines. The control program includes a functional entity for creating a virtual machine, resident in the computer complex and providing the sole functional interface between the complex and a terminal connected to the complex. The control program also includes a virtual buffer entity for creating a non-dispatchable, pseudo-virtual machine, resident in the computer complex and providing the sole functional interface between the complex and a respective control program function. The virtual buffer entity creates a pseudo-virtual machine in response to a requirement of the respective control program function for virtual storage resources and links the created pseudo-virtual machine with virtual storage resources in the virtual storage facility.

Therefore, it is a principal objective of the present invention to provide virtual storage resources to an operating system control program beyond those provided by the present art.

It is a further objective to provide virtual storage resources dynamically to a functional entity in an operating system control program by treating the entity in a manner corresponding to a terminal connected to a computer complex wherein the operating system is resident.

A still further objective of the present invention is to dynamically provide virtual storage resources to an operating system control program function by creating a non-dispatchable virtual machine, linked to virtual storage resources that are available exclusively to the function.

Other objects and attendant advantages of the present invention will become more evident when the following description is read in conjunction with the below-described drawings.

DESCRIPTION OF THE PREFERRED EMBODIMENT

Figure 1:
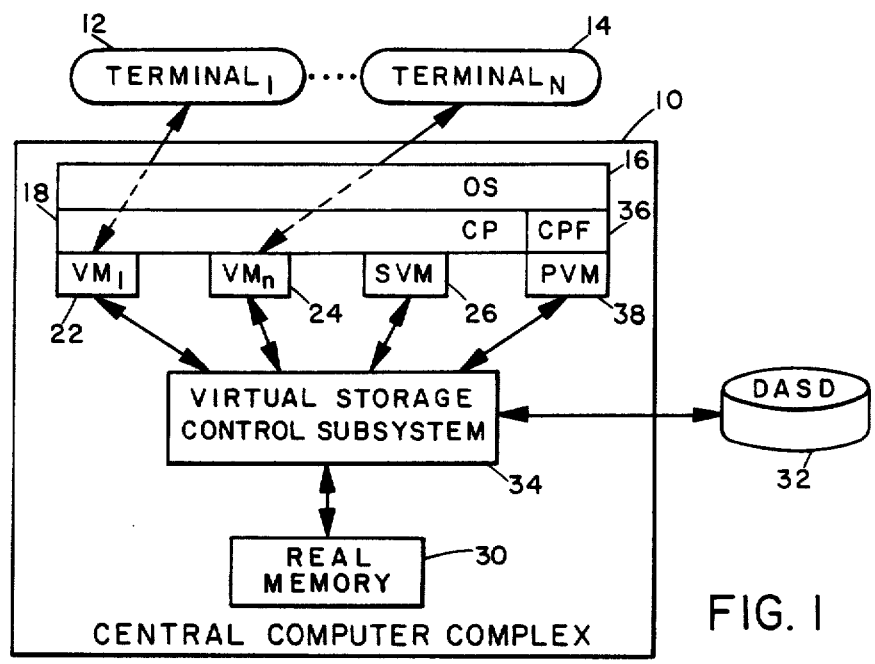
FIG. 1 is a diagrammatic illustration of a central computer complex with an operating system control program including a control program function with an associated pseudo-virtual machine.

Referring first to FIG. 1, a high level diagram is shown illustrating, for example, both a portion of the real resources and the internal programmatic structure in an IBM System/370 VM/SP implementing a multiprogramming arrangement that enables a plurality of remote terminals to be connected to a central computer complex for the purpose of utilizing computational and storage facilities in the complex for executing various computer programs.

The IBM System/370 architecture is described in IBM System/370 PRINCIPLES OF OPERATION, IBM Publication GA22-000-6. The VM/SP is described in a collection of manuals entitled THE VM/SP LIBRARY, available from IBM. Of particular assistance in understanding the method and apparatus of the invention is the VM/SP library volume entitled SYSTEM LOGIC AND PROBLEM DETERMINATION GUIDE (CP), Release 4, IBM Publication No. LY20-0892-3.

In this embodiment, by way of example, a central computer complex 10 including an IBM System/370 running the VM/SP, is connected conventionally to a plurality of remote terminals, two of which are indicated by reference numerals 12 and 14. The physical and electronic interconnection between the terminals and the central computer complex are well understood by those versed in the art. As reference to the VM/SP library will disclose, the central computer complex 10 has resident in it an operating system of the VM/SP type. The operating system (OS) 16 has a control program (CP) component 20. As is known, the CP 20 manages access to the resources of the central computer complex 10 for the plurality of terminals connected to the complex through the well-understood procedures of multiprogramming and virtual machine creation. In this regard, a pair of virtual machines, $VM_1$ and $VM_n$, 22 and 24, respectively, have been created to provide the sole functional interface between the terminals 12 and 14, and the resources of the central computer complex 10.

The creation and operation of the virtual machines 22 and 24 is conventional. Essentially, the procedure entails responding to an interruption from a console or terminal physically connected to the complex, creating a virtual machine for attachment to the system, if none exists for the terminal, and initializing the virtual machine by the well-known initial program load (IPL) procedure. Reference here is made to the SYSTEM LOGIC AND PROBLEM DETERMINATION GUIDE, pp. 250–251.

Further, when the operating system 16 is initially loaded into the central computer complex 10, the system virtual machine (SVM) 26 is generated as a part of the operating system IPL process.

The virtual machines 22, 24 and 26 represent multiple, independently executing programs that generate requirements for use of the computing and storage resources of the computer complex 10. These demands are arbitrated and program access to the resources is serialized by the CP 20. In particular, in the context of the present invention, such serialization concerns the access of independent processes to the resources of the virtual storage facility in the computer complex 10. The resources of the virtual storage facility are represented by a real memory 30, the primary storage resource, and the auxiliary resource, represented by the direct access storage device (DASD) 32. The virtual storage facility also includes a virtual storage access subsystem 34. Conventionally, the virtual access subsystem 34 is one of a number of resource control subsystems of which the control program 18 is compounded. The subsystem 34 is shown separate from the control program 18 in FIG. 1 only fur purposes of the description; it is to be understood, however, that the subsystem 34 is a subset of the basic complement of resource control functions of the control program 16.

The operation of the virtual storage access subsystem 34 is well understood. Briefly, the subsystem 34 allocates virtual storage resources to each virtual machine when the virtual machine is created. The subsystem 34 also serializes the access of the virtual machines to the virtual storage resources and handles the transfer of commands and data between the real memory 30 and the DASD 32.

As thus far described, the multiterminal computer arrangement of FIG. 1 forms the operational context of the method and apparatus of the invention. Now, a condition leading to the need for the invention is postulated. The condition is this: the basic complement of control functions of the CP 18 is augmented by a further control program function (CPF) 36, which can be conventionally expressed as a series of statements and commands forming a functional module of the control program 18. In appreciating the invention, it is assumed that execution of the CPF 36 entails a virtual storage resource requirement that cannot be efficiently satisfied by the previously-discussed procedures. Therefore, in order to efficiently execute the CPF 36, the method and apparatus of the invention provide a pseudo-virtual machine 38, that enables the CPF to compete for access to the resources of the computer complex 10 on the same basis as the virtual machines 22, 24, and 26. However, the pseudo-virtual machine 38 is non-dispatchable, in that it does not and cannot provide a functional interface between an externally-connected terminal and the resources of the computer complex 10. Rather, the pseudo-virtual machine (PVM) 38 provides the functional connectivity between CPF 36, whenever the CPF is invoked, and the resources of the complex. In this regard, the connectivity between the PVM 38 and the virtual storage control subsystem 34 is essentially the same as the connectivity between the subsystem 34 and the virtual machines 22, 24, and 26, with the exception that the subsystem 34 is given to understand, in a manner described below, that the PVM 38 is non-dispatchable.

Figure 2:
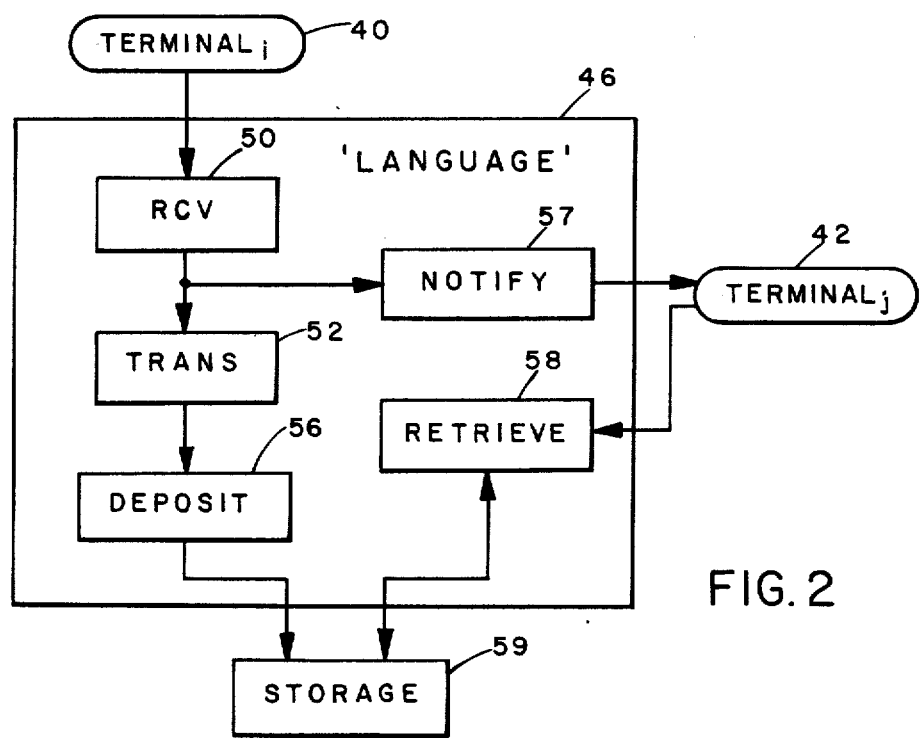
FIG. 2 is a diagrammatic illustration showing in more detail the control program function of FIG. 1.

For a better understanding of the condition giving birth to the necessity for the invention, reference is made to FIG. 2. In FIG. 2 the CPF 36 is exemplified by a LANGUAGE functional module that is contained in the control program 18. In this example, it is the function of the LANGUAGE module to provide language translation and message passing services between terminals connected to the computer complex 10. Thus, a terminal 40 may be operated by a Francophone user who desires to pass a message to a German-speaking operator of terminal 42. In dispatching the message from the terminal 40, indication is provided to the CP 18 that translation and message-passing services are required 40. In response, the CP 18 invokes the LANGUAGE module 46. The functional structure of the LANGUAGE module 46 includes a receive (RCV) unit 50, a translate (TRANS) unit 52, a DEPOSIT unit 56, a notification (NOTIFY) unit 62 and a retrieval (RETRIEVE) unit 58. In operation, the RCV UNIT 50 receives the French message from the terminal 40 and calls the TRANS and NOTIFY units 52 and 57. The TRANS unit 52 translates the message from French to German and calls the DEPOSIT unit 56. The DEPOSIT unit 56 places the message in a message depository in the virtual storage resources allocated to the LANGUAGE module 46 in the virtual storage facility (STORAGE) 59 of the computer complex. Meanwhile, the NOTIFY unit 57 has provided an indication to the terminal 42 that a translated message is being held for it. The terminal 42 retrieves the message by invoking the LANGUAGE module 4 and using the RETRIEVE unit 58 to obtain the message from the virtual storage resource 59.

As is known, the execution of the LANGUAGE module 46 requires virtual storage resources to store the program representing the module, retain the message repository, and provide work area for temporary storage of data and commands when the module is being executed. It will be appreciated that the storage requirements of such a control program function can be considerable and can approach, or even exceed, the 5M byte real storage allowed for the CP.

In order to provide the storage resources required for a control program function such as the LANGUAGE module of FIG. 2, the invention provides for the creation of a non-dispatchable, pseudo-virtual machine to serve as the functional interface between the CPF and the computer complex. As with the creation of virtual machines for externally-connected terminals, the creation of a pseudo-virtual machine entails the allocation of virtual storage resources to the machine. In this regard, initialization of a virtual machine entails the creation of a virtual machine control block (VMBLOK), a data object resident in the control program that contains, for a dispatchable virtual machine, the dispatch and priority level of the machine, the virtual machine's CPU registers, an indication of what the machine is used for, and linkages to virtual storage resources allocated to the machine. In the creation of a pseudo-virtual machine, a pseudo-VMBLOK is created for the machine that contains, among other information, an indication that the machine is non-dispatchable, the priority level of the machine, the CPU registers to be used by the machine, and linkages to the virtual storage resources allocated to the machine. Further, it is understood that the pseudo-virtual machine complement of resources is compounded primarily of the virtual storage required by the CPF 36. However, this is not intended to exclude the possibility, in other embodiments, of building a pseudo-virtual machine with a complement of resources equal to that of any virtual machine created for a terminal.

Means for building a pseudo-virtual machine correspond essentially to those used by the control program to create a dispatchable virtual machine, with the exception that, in the pseudo-VMBLOK of the created pseudo machine, a non-dispatchable indication is entered and the pseudo-VMBLOK is placed in a sector of the control program reserved for a pseudo-VMBLOK list, explained in greater detail below.

Figure 3:
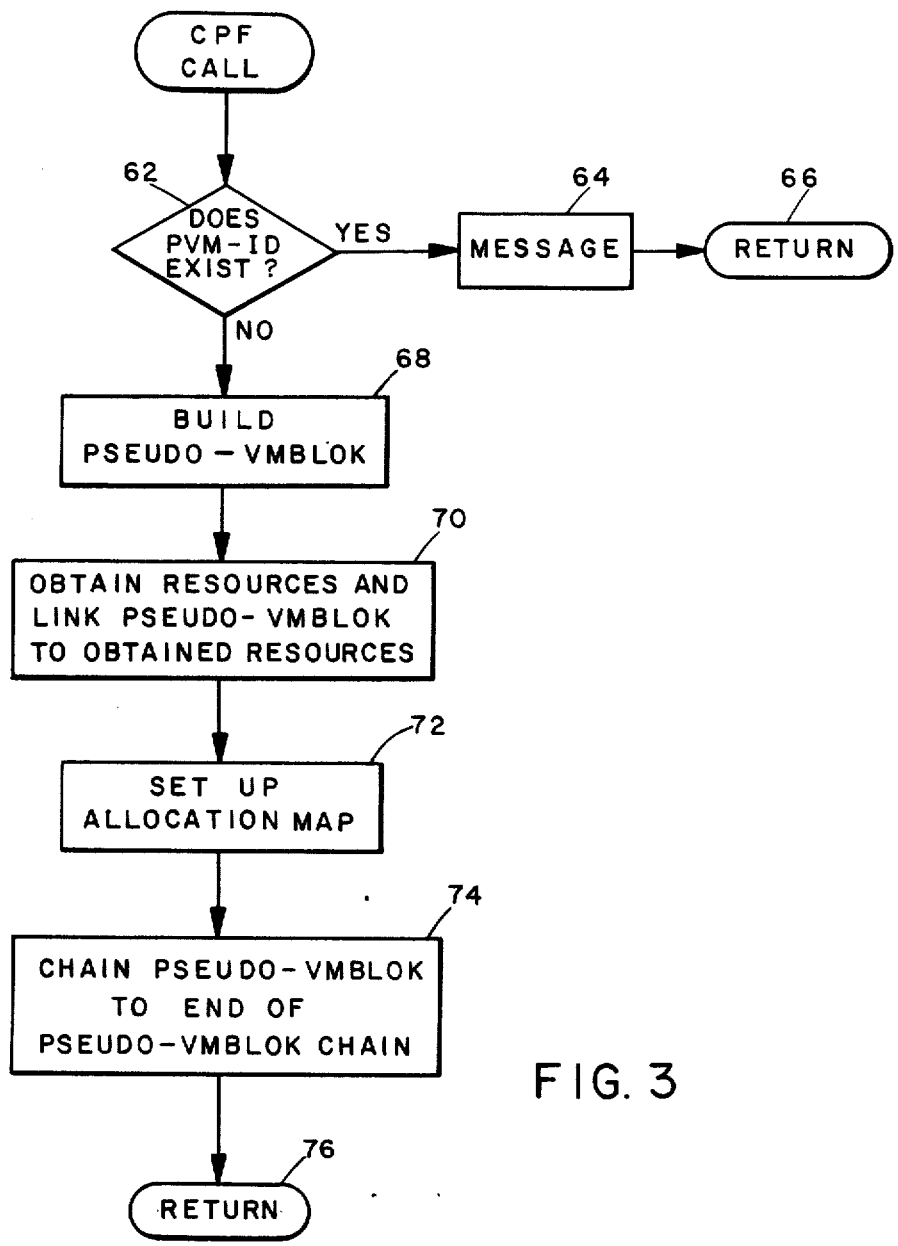
FIG. 3 is a flow chart illustrating the method of the invention.

The procedure for allocating virtual storage resources, through the creation of a pseudo-VMBLOK, is illustrated in the flow diagram of FIG. 3. In FIG. 3, the initialization of a CPF results in the call to the sector of the control program reserved for listing the pseudo-VMBLOKs to determine what has already been created for the CPF. Thus, the call to the procedure includes the size of virtual storage resources required and the identification (ID) of the pseudo-VMBLOK. Initially, the call is received by decision step 62, which decides whether the identified pseudo-VMBLOK, PVM—ID, exists. If the block exists, an error indication is generated in step 64 and a return is made to the calling CPF in step 66. It is understood that the calling CPF has means to take appropriate action in response to such an error indication.

In the event that a pseudo-virtual machine has not yet been created for the calling CPF, the negative exit is taken from the decision 62. In the first step following the negative exit, a pseudo-VMBLOK is built for the pseudo-virtual machine being created fo the calling CPF. This is step 68. Next, in step 70, the procedure obtains virtual storage resources required by the calling CPF and links the resources to the pseudo-VMBLOK built in step 68. Next, in step 72, a memory allocation map is created for the use of the virtual storage control subsystem 34. As is known, an allocation map is used by the subsystem 34 to keep track of the portions of a virtual machine program currently being used. As will be appreciated, the VM/SP operating system being based upon a segment/page structure for the virtual storage system, the allocation map created in step 72 will be a page allocation map. For an understanding of the structure and operation of a storage system with paged segments, reference is given to the Hwang and Briggs volume at pp. 77-80.

Finally, the invention entails the creation and maintenance of a pseudo-VMBLOK list by the control program 18, which includes a conventional FIFO queue into which pseudo-VMBLOKs are connected as they are created. It will be appreciated that the pseudo-VMBLOK list can be scanned by the process implementing the decision 62. In this regard, the list is scanned to determine whether the pseudo-VMBLOK identified by the calling CPF is included in the list. If so, the positive exit is followed from the decision; otherwise, the process takes the negative exit.

Finally, after the creation, linkage, and chaining of a pseudo-VMBLOK, the procedure of FIG. 3 returns to the calling CPF with an indication that a pseudo-virtual machine has been created for the CPF, the pseudo machine linking the CPF, through the pseudo-VMBLOK, to the virtual storage resources required by the CPF.

The means for implementing the pseudo-VMBLOK building step 68 include a virtual buffer program module resident in the CP 18. For convenience, the module is referred to hereinafter as DMKVBMVM. Conventional programming means, well understood in the art, are available to implement DMKVBMVM in, for example, assembly language. A corresponding known function, DMKBLDVM, is explained in the above-referenced SYSTEM LOGIC AND PROBLEM DETERMINATION GUIDE at page 278 for building VMBLOKs for virtual machines. In the invention, DMKVBMVM is a CP process which builds a pseudo-VMBLOK by means of a functional sequence laid out in Table I.

TABLE I
DMKVBMVM

1. Obtain and allocate free virtual storage large enough to satisfy requirements of calling CPF;
2. Indicate absence of virtual hardware resources other than virtual storage;
3. Indicate that this pseudo-virtual machine is non-dispatchable; and
4. Indicate that this pseudo-virtual machine is disabled.

The virtual storage resource capture and linkage of program step 70 are implemented in the preferred embodiment by means of the well-known DMKBLD function of the VM/SP CP. For an understanding of the DMKBLD function, the reader is referred to the VM/SP Library. Briefly, the DMKBLD function includes provision for allocating storage for a virtual machine, and initializing the portion of the VMBLOK that identifies and links the virtual machine to the allocated storage. The module further creates and initializes segment, page, and swap tables as a function fo the required virtual storage resource size. The module performs these functions while undertaking the broader function of creating and initializing the VMBLOK for a virtual machine.

The further functions of allocation map creation (step 72) and chaining (step 74) are well-known in the art and require no further explanation.

A pseudo-code listing of the procedure for creating a pseudo-VMBLOK is given in Table II. As is conventional, Table II includes input parameters which, in the case of the invention, consist of the size of the required virtual storage resource. This is expressed as a virtual address space size, which is a well-known mode of expressing storage size. The second input parameter is the identification of the virtual storage space by a specific name. The process of Table II consists, first, of a well-known list scanning procedure (line 81) by which the pseudo-VMBLOK list is scanned for the named virtual space. Lines 83 and 84 implement the positive exit from decision 62 of FIG. 3, while lines 85–101 implement the negative exit. Of particular interest in the portion of the process implementing the negative exit are calls to CP routines DMKVBMVM and DMKBLD to build a pseudo-VMBLOK and to allocate and link virtual storage resources to the built block. In steps 93–96, the allocation map discussed above is built. The created VMBLOK is linked to the pseudo-VMBLOK list in steps 97–99. The process is conventionally terminated in steps 100 and 101.

TABLE II

Figure 4:
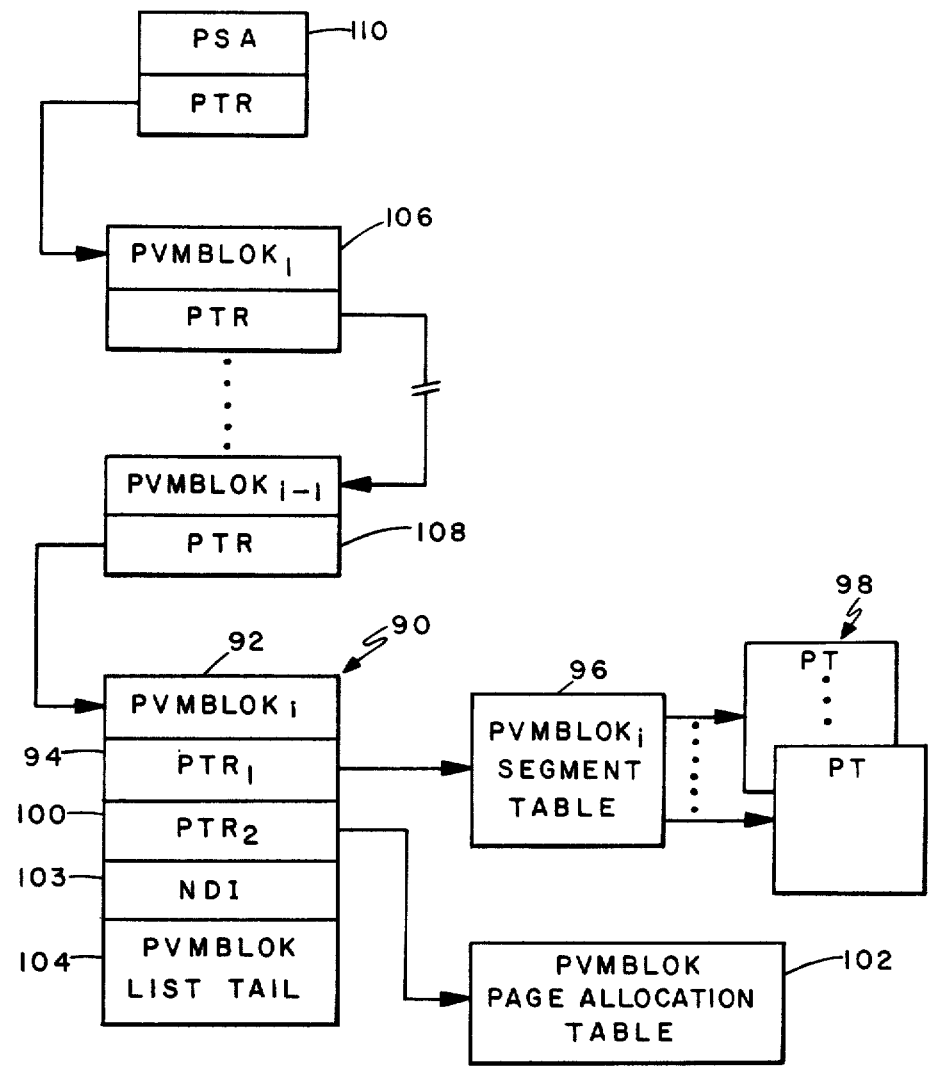
FIG. 4 is a diagrammatic illustration of various control blocks and data areas comprising the apparatus of the invention and referenced in executing the method of the invention.

INPUT PARAMETERS
80 Size of virtual address space
81 Name under which to maintain this space
PROCESS
82 Scan pseudo-VMBLOK list for requested space
83 If requested space exists, THEN
84 RETURN to caller with message
85 ELSE
86 CALL DMKVBMVM to build this pseudo-VMBLOK
87 CALL DMKBLD to allocate virtual
88 storage space and to build page and
89 segment tables to map the allocated
90 virtual storage space and associate
91 page and segment tables with the
92 pseudo-VMBLOK
93 BUILD allocation map for the allocated
94 virtual storage space and
95 associate it with the created
96 pseudo-VMBLOK
97 CHAIN this pseudo-VMBLOK to
98 the end of the pseudo-VMBLOK
99 list
100 RETURN
101 ENDIT FIG. 4 illustrates the data objects that allocate and link a CP function to its required virtual storage space. In FIG. 4, a pseudo-VMBLOK created by the procedure of Table II is indicated generally by 90. The block 90 includes a field 92 in which an identifier of the block is stored. In this example, the block identifier is the name of the block, $PVMBLOK_i$. A second field 94 contains a pointer ($PTR_1$) to the segment and page tables, 96 and 98, respectively, built by the process of Table I for the block. As is conventional, the segment and page tables 96 and 98 embody the means for mapping virtual storage addresses contained in the CPF using the pseudo-VMBLOK 90 to actual memory addresses in the virtual storage resources of the compute complex 10. The block field 100 contains a second pointer ($PTR_2$) that points to the page allocation table 102 created by the Table II process. The page allocation table 102 is conventional in that it marks as busy those portions (pages) of the allocated virtual storage which are presently being used. The field 103 of the block 90 contains the non-dispatchable indicator (NDI) signifying that the pseudo-virtual machine associated with the block 90 is non-dispatchable. Finally, the field 104 provides space for linking to the PVMBLOK list maintained by the CP 18. In FIG. 4, the pseudo-VMBLOK 90 is the last entry into the list and therefore contains the list tail. When the next pseudo-VMBLOK is added to the list underneath the block 90, a pointer to that block will be placed in the field 104.

The pseudo-VMBLOK list maintained by the control program 18 is a conventional linked-chain that includes pseudo-VMBLOKs 106 and 108. The chain is connected by a pointer (PTR) and the prefix storage area (PSA) 110 of the control program 18. As is known, the PSA 110 is the block of storage allocated to the control program 18 whose location is never changed while the program resides in the computer complex 10.

Therefore, it can be appreciated that the pseudo-VMBLOKs created by the process of FIG. 3 and Table II and illustrated in FIG. 4 constituting the critical components for this preferred embodiment of the virtual storage resource provision protocol of the invention because they provide the key mechanisms required for allocating and linking required virtual storage resources to control program functions.

I claim:

1. A method for dynamically providing virtual storage resources to a computer operating system control program controlling the concurrent execution of multiple virtual machines on a computing complex with a virtual storage facility shared by said virtual machines, comprising the steps of:
   requesting virtual storage resources for supporting a control program processing requirement; and
   in response to a control program virtual storage resource request:
      establishing a non-dispatchable, pseudo-virtual machine control block including virtual storage resource linkages; and
      devoting virtual storage resources to the processing requirement and connecting the devoted resources to the storage resource linkages of the devoted resources machine control block.

2. A method for dynamically providing virtual storage resources to a computer operating system control program controlling the concurrent execution of multiple virtual machines on a computing complex with a virtual storage facility shared by said virtual machines, comprising the steps of:
   requesting virtual storage resources for supporting a control program processing requirement;
   in response to a control program virtual storage resource request:
      establishing a non-dispatchable, pseudo-virtual machine control block including virtual storage resource linkages and connecting virtual storage resources to the virtual storage resource linkages of the pseudo-virtual machine control block;
   creating a list of non-dispatchable virtual machine blocks; and
   attaching the pseudo-machine control block to the list.

3. The method of claim 2 further including the step of executing said processing requirement by calling said pseudo-virtual machine block.

4. A system for dynamically providing virtual storage resources to a virtual-machine computer operating system control program, comprising:
   a multi-facility computer complex including a virtual storage facility;
   a multi-function control program means for controlling access to the facilitates of said computer complex by a plurality of autonomous virtual machines; and
   virtual buffer means in said control program means for creating a non-dispatchable, pseudo-virtual machine, resident in said computer complex and connecting said virtual storage facility with a respective control program function of said control program means, said virtual buffer means creating said non-dispatchable, pseudo-virtual in response to a requirement of said control program function for virtual machine storage resources, and said virtual buffer means linking said non-dispatchable, pseudo-virtual machine with virtual storage resources in said virtual storage facility.

* * * * *

UNITED STATES PATENT AND TRADEMARK OFFICE
CERTIFICATE OF CORRECTION

PATENT NO. : 4,916,608

DATED : April 10, 1990

INVENTOR(S) : Steven S. Shultz

It is certified that error appears in the above-identified patent and that said Letters Patent is hereby corrected as shown below:

Col. 10, line 25, please change "devoted resources" to --pseudo-virtual--

Col. 10, line 53, please change "facilitates" to --facilities--.

Signed and Sealed this

Second Day of July, 1991

Attest:

HARRY F. MANBECK, JR.

*Attesting Officer*   *Commissioner of Patents and Trademarks*